United States Patent
Shindo

(10) Patent No.: US 10,949,720 B2
(45) Date of Patent: Mar. 16, 2021

(54) CONVERTING IMAGE DATA RESOLUTION USING DIFFERENT COEFFICIENTS DEPENDING ON WHETHER A TARGET PIXEL CONSTITUTES A PREDETERMINED DOT

(71) Applicant: CANON KABUSHIKI KAISHA, Tokyo (JP)

(72) Inventor: Yukihiro Shindo, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 16/277,275

(22) Filed: Feb. 15, 2019

(65) Prior Publication Data
US 2019/0258908 A1 Aug. 22, 2019

(30) Foreign Application Priority Data
Feb. 21, 2018 (JP) .............................. JP2018-029050

(51) Int. Cl.
*G06K 15/02* (2006.01)
*H04N 1/405* (2006.01)
*H04N 1/40* (2006.01)

(52) U.S. Cl.
CPC ..... *G06K 15/1876* (2013.01); *G06K 15/1881* (2013.01); *H04N 1/4055* (2013.01); *H04N 1/40068* (2013.01)

(58) Field of Classification Search
CPC ........... G06K 15/1876; G06K 15/1881; G06K 15/1874; H04N 1/4055; H04N 1/40068
See application file for complete search history.

(56) References Cited

U.S. PATENT DOCUMENTS 8,824,015 B2    9/2014  Kashibuchi
2013/0293928 A1* 11/2013 Kashibuchi ............ H04N 1/405
                                            358/3.06

FOREIGN PATENT DOCUMENTS

JP    04336859 A    11/1992
JP    2013236180 A  11/2013

* cited by examiner

*Primary Examiner* — Christopher Wait
(74) *Attorney, Agent, or Firm* — Venable LLP

(57) ABSTRACT

An image processing apparatus that converts image data of a first resolution into image data of a second resolution lower than the first resolution. The image processing apparatus determines a small dot that is included in the image data of the first resolution and matches a first small dot pattern and performs conversion from the first resolution to the second resolution by switching a method of generating resolution-converted image data based on a result of the determination.

17 Claims, 17 Drawing Sheets

FIG. 5

PROCESSING OPTIONS

LIST OF SETTING ITEMS ~502

| SETTING ITEMS | SETTING CONTENT |
|---|---|
| NUMBER OF COLORS | FULL COLOR |
| DETAILED MODE | HIGH QUALITY |
| RESOLUTION | FINE (600dpi) |
| HALFTONE | PATTERN 2 |
| TONER SAVING MODE | DO NOT USE |
| TONER DENSITY ADJUSTMENT | 0 (STANDARD) |
| COLOR BALANCE ADJUSTMENT | DO NOT USE |
| SMOOTHING | 0 (STANDARD) |
| SHARPNESS | 0 (STANDARD) |
| GRAY COMPENSATION | ONLY TEXT |
| IMAGE COMPRESSION | STANDARD |
| TRAPPING | NO |
| FATTENING PROCESS | NO |
| HIGH SATURATION PRINT MODE | DO NOT USE |

503 ~ RESOLUTION: FINE (600dpi) / SUPER FINE (1200dpi)

RETURN TO STANDARD    OK    CANCEL    HELP

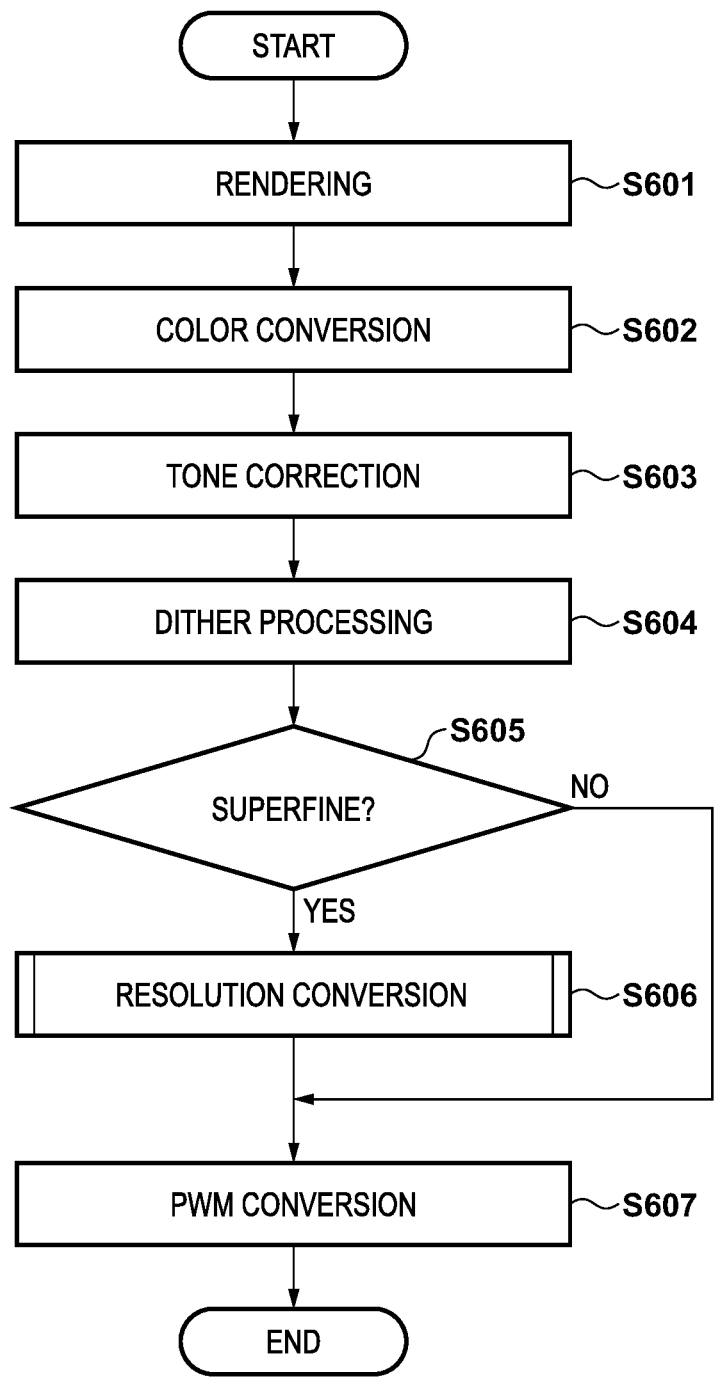

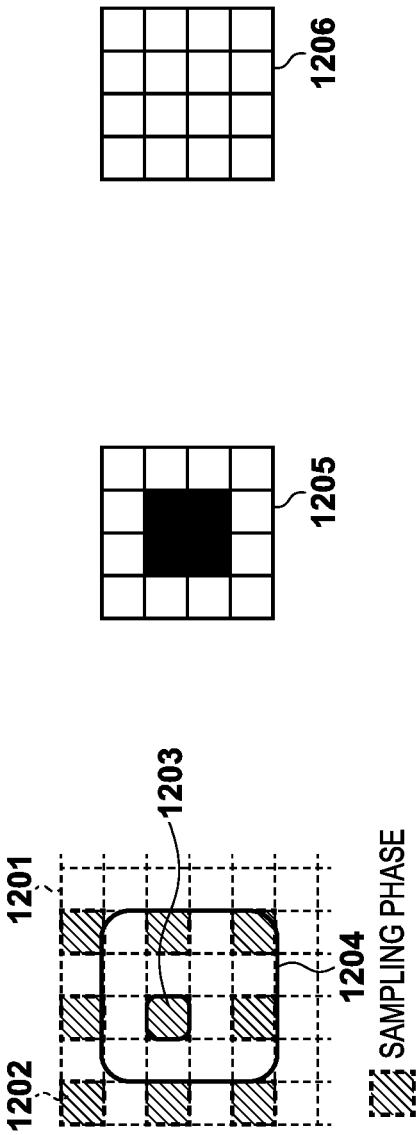

▨ SAMPLING PHASE
▦ INDEFINITE
▶ SCAN LINE CHANGE POINT
※ARROW INDICATES DIRECTION OF SCAN LINE CHANGE

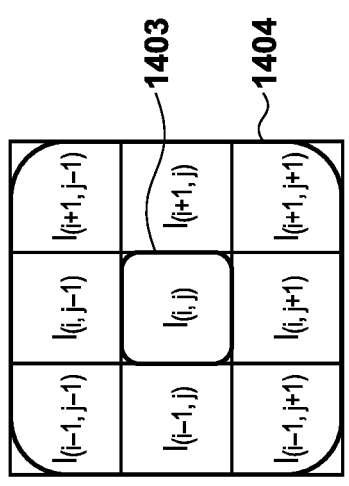
FIG. 14C
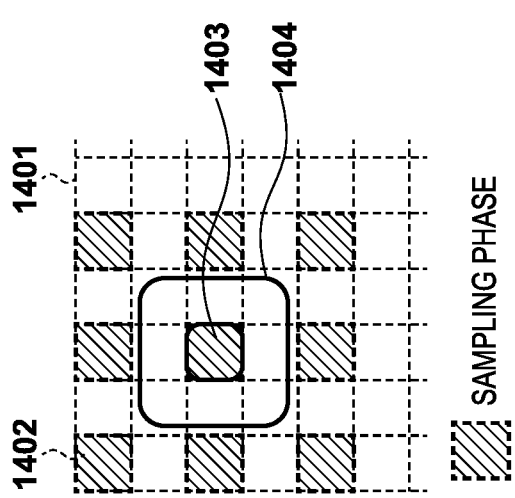
FIG. 14A  FIG. 14B
FIG. 14D  FIG. 14E  FIG. 14F

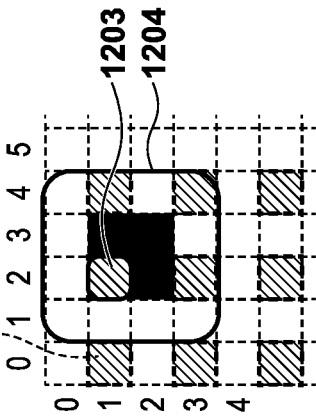
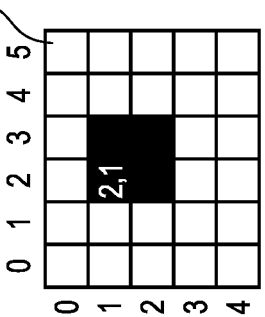
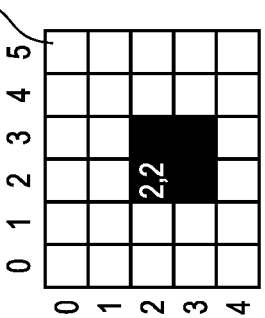

CONVERTING IMAGE DATA RESOLUTION USING DIFFERENT COEFFICIENTS DEPENDING ON WHETHER A TARGET PIXEL CONSTITUTES A PREDETERMINED DOT

BACKGROUND OF THE INVENTION

Field of the Invention

The present invention relates to an image processing apparatus, a method of controlling the same, and a storage medium.

Description of the Related Art

The copy accuracy of an image forming apparatus configured to perform copy improves, and it is easy to perform illegal copy of copying a specific original image, whose copy should be inhibited, to create an illegal copied material. To prevent illegal copy of a specific original image, a technique of compositing copy-forgery-inhibited image data for copy prevention with an original image is implemented. Such a copy-forgery-inhibited image is formed by a latent-image part and a background part. The data of the background part is a pattern image of a set of small dots (for example, one pixel in 600 dpi) of a single-color Max PWM signal. This pattern image disappears at the time of copy because of the limited copy reproduction capability of a copying machine. Max PWM means that one pixel is irradiated for a maximum light emission time designated in advance. The data of the latent-image part is reproduced at the time of copy by a pattern image of a set of large dots (for example, seven pixels in 600 dpi) of a single-color Max PWM signal. Accordingly, in a copied image, only the latent-image part of the copy-forgery-inhibited image remains, and the copy-forgery-inhibited image becomes visible. Note that when printing an original, the copy-forgery-inhibited image is printed by performing adjustment such that the density of small dots matches that of large dots, and the latent-image part and the background part cannot be identified by human eye. More specifically, the densities are made to match by adjusting the size of one dot (the number of pixels) for the large dots and adjusting the dot density per unit area for the small dots.

Next, an electrophotographic image forming apparatus employs a technique called spot-multiplexing, which prints an image at a pseudo-high resolution to perform accurate and precise printing at a low cost, as in Japanese Patent Laid-Open No. H4-336859. Additionally, Japanese Patent Laid-Open No. 2013-236180 describes the following technique. Dither processing is performed for image data that is rendered at a high resolution, and a misregistration of a color plane is corrected finely at a high resolution. Then, processing (pseudo-high resolution conversion processing) of converting the image data into a low resolution equal to the print resolution is performed to do spot-multiplexing of the image data. A dither matrix for suppressing an occurrence of color unevenness at this time is described. Since the pseudo-high resolution conversion processing handles data of a resolution higher than the print resolution and therefore causes an increase in the use memory or processing load. For this reason, the image forming apparatus generally has a normal resolution setting using the same resolution as the print resolution independently of the pseudo-high resolution setting to perform the pseudo-high resolution conversion processing.

In pattern image printing of a set of small dots (for example, FIG. 11A), small dots spot-multiplexed by pseudo-high resolution conversion processing are not Max PWM signals but intermediate PWM signals of a plurality of pixels (for example, FIG. 11B). In the intermediate PWM signals, since printing is performed by emitting a laser beam for a shorter time by the print resolution, unstable small dots are formed, it is difficult to implement the same reproduction as small dots having the normal resolution using Max PWM signals (for example, FIG. 11C). In the copy-forgery-inhibited image technique, it is important to form small dots beyond the copy reproduction capability of a general copying machine at a stable density by the image forming apparatus. However, the following problems are posed.

In copy-forgery-inhibited image printing, it is necessary to perform adjustment to make the density of the latent-image part match that of the background part at each of the resolutions of the normal resolution setting and the pseudo-high resolution setting, and this takes effort.

The reproducibility of the intermediate PWM signal is low depending on the image forming apparatus. Since small dots that are Max PWM signals change to "intermediate PWM signals" of a plurality of pixels by pseudo-high resolution processing, the small dots cannot be printed in a sufficient size. For this reason, in the copy-forgery-inhibited image printing, it is impossible to hide the latent-image part by making the density of the background part match that of the latent-image part.

The reproducibility of the intermediate PWM signal is high depending on the image forming apparatus. Since small dots that are Max PWM signals change to the intermediate PWM signals of "a plurality of pixels" by pseudo-high resolution processing, the small dots are printed while largely spreading. For this reason, in the copy-forgery-inhibited image printing, the small dots do not sufficiently disappear at the time of copy, and the latent-image part does not become visible.

SUMMARY OF THE INVENTION

An aspect of the present invention is to eliminate the above-mentioned problem with conventional technology.

A feature of the present invention is to provide a technique of reproducing a small dot pattern used in a copy-forgery-inhibited image or the like at the same reproduction performance as the resolution of original image data.

According to a first aspect of the present invention, there is provided an image processing apparatus for converting image data of a first resolution into image data of a second resolution lower than the first resolution, the image processing apparatus comprising: a controller, having at least one processor which executes instructions stored in a memory, one or more circuitry, or, a combination of the at least one processor and the one or more circuitry, being configured to: determine a small dot that is included in the image data of the first resolution and matches a first small dot pattern; and perform conversion from the first resolution to the second resolution by switching a method of generating resolution-converted image data based on a result of the determination.

According to a second aspect of the present invention, there is provided a method of controlling an image processing apparatus for converting image data of a first resolution into image data of a second resolution lower than the first resolution, the method comprising: determining a small dot that is included in the image data of the first resolution and matches a first small dot pattern; and performing conversion from the first resolution to the second resolution by switching a method of generating resolution-converted image data based on a determination result in the determining.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 depicts a view showing an example of a function setting screen displayed on a UI unit of the image forming apparatus according to the first embodiment;

FIG. 6 is a flowchart for describing processing by the image processing unit according to the first embodiment;

FIG. 9 depicts a view showing an example of a dither matrix of 1,200 dpi_1 bit;

FIG. 10 depicts a view showing an example in which small dots each including 2×2 pixels (square) are not generated by dither processing;

FIGS. 12A to 12C depict views schematically showing small dot determination processing of a small dot determination module 409 according to the first embodiment;

FIGS. 14A to 14F depict views schematically showing pseudo-high resolution conversion processing by a pseudo-high resolution conversion module according to the first embodiment;

FIGS. 15A to 15C depict views for explaining the relationship between small dot determination processing and image data in the first embodiment;

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In the first embodiment to be described below, an image processing apparatus characterized by performing small dot determination for a halftone dot image having a high resolution in pseudo-high resolution setting, and performing resolution conversion to a low resolution based on the small dot determination result will be described. In the embodiments to be described below, for example, an image forming apparatus such as a multi-function peripheral will be described as an example of the image processing apparatus according to the present invention.

First Embodiment

Figure 1:
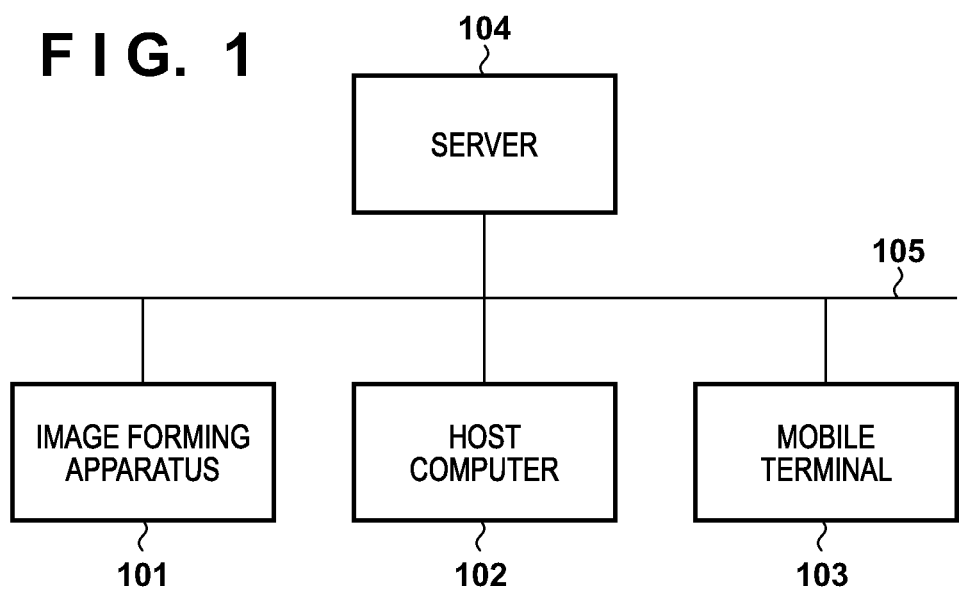
FIG. 1 depicts a view for explaining the arrangement of an image processing system including an image forming apparatus according to the first embodiment of the present invention.

FIG. 1 depicts a view for explaining the arrangement of an image processing system including an image forming apparatus 101 according to the first embodiment of the present invention.

The image processing system includes the image forming apparatus 101, a host computer 102, a mobile terminal 103, and a server 104, which are connected via a network 105. Each of the host computer 102, the mobile terminal 103, and the server 104 generates print data including a predetermined small dot pattern such as a copy-forgery-inhibited image, transmits it to the image forming apparatus 101 via the network 105, and causes the image forming apparatus 101 to form (print) an image.

The image forming apparatus 101 receives the print data via the network 105 and executes printing (image formation) by an electrophotographic process using a printer unit 306 (FIG. 3) belonging to the image forming apparatus 101. In addition, image data obtained by reading an original using an image reading unit 302 (scanner) belonging to the image forming apparatus 101 can be transmitted to the host computer 102, the mobile terminal 103, and the server 104 via the network 105. Furthermore, when the image data obtained by the reading is printed using the printer unit 306 of the image forming apparatus 101, a copy operation can be implemented.

Note that in the following description, the host computer 102 generates print data including a copy-forgery-inhibited image with a small dot pattern as the background part, transmits it to the image forming apparatus 101 via the network 105, and causes the image forming apparatus 101 to print it. The image forming apparatus 101 renders the print data received from the host computer 102, and executes color conversion processing, dither processing, and the like in the arrangement example. However, the present invention is not limited to this arrangement, and various kinds of image processing may be executed by the host computer 102 or the like, which is the transmission source of the image data. Alternatively, image processing may be performed by the image forming apparatus 101 distributively in cooperation with the host computer 102, the mobile terminal 103, the server 104, or the like, which is the transmission source of the image data.

The arrangement of the host computer 102 will be described next.

Figure 2:
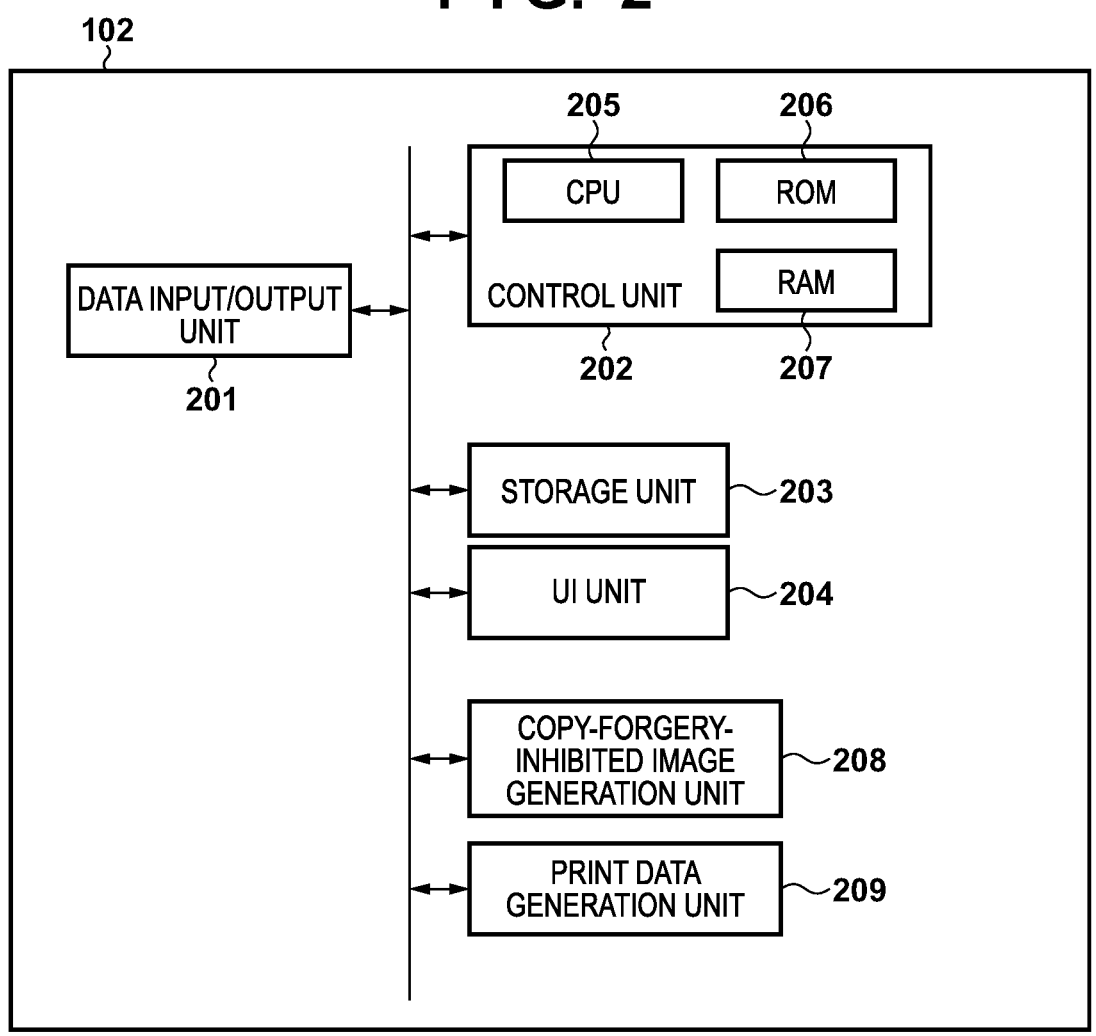
FIG. 2 is a block diagram for explaining the arrangement of a host computer according to the first embodiment.

FIG. 2 is a block diagram for explaining the arrangement of the host computer 102 according to the first embodiment.

The host computer 102 includes a data input/output unit (transmission/reception unit) 201, a control unit 202, a storage unit 203, a UI (User Interface) unit 204, a copy-forgery-inhibited image generation unit 208, and a print data generation unit 209. The data input/output unit 201 transmits print data generated by the print data generation unit 209 to, for example, the image forming apparatus 101 via the network 105. Additionally, for example, image data obtained by reading an original using the image reading unit 302 of the image forming apparatus 101, or the like is received via the network 105. The control unit 202 controls the operation of the host computer 102, and includes a CPU 205, a ROM 206, and a RAM 207. The CPU 205 executes a boot program stored in the ROM 206, deploys a program stored in, for example, the storage unit 203 into the RAM 207, executes the deployed program, and controls the operation of the host computer 102. The storage unit 203 is, for example, a hard disk drive (HDD) and can store a large capacity of data. The UI unit 204 includes an operation panel and a display unit, displays document data to be printed or a message to a user, and receives an operation instruction by the user. Note that the UI unit 204 may have a touch panel function.

Upon receiving a copy-forgery-inhibited image composition instruction from the UI unit 204, the copy-forgery-inhibited image generation unit 208 generates copy-forgery-inhibited image data and transfers the copy-forgery-inhibited image data to the print data generation unit 209. Note that the copy-forgery-inhibited image composition instruction from the UI unit 204 can designate one color plane of color materials (CMYK) used by the printer unit 306 of the image forming apparatus 101. Here, the basic resolution of the copy-forgery-inhibited image data is 600 dpi. If the resolution setting in printing to be described later is, for example, 1,200 dpi, one pixel in 600 dpi is fragmented to 2×2 pixels and thus simply enlarged.

Figure 8:
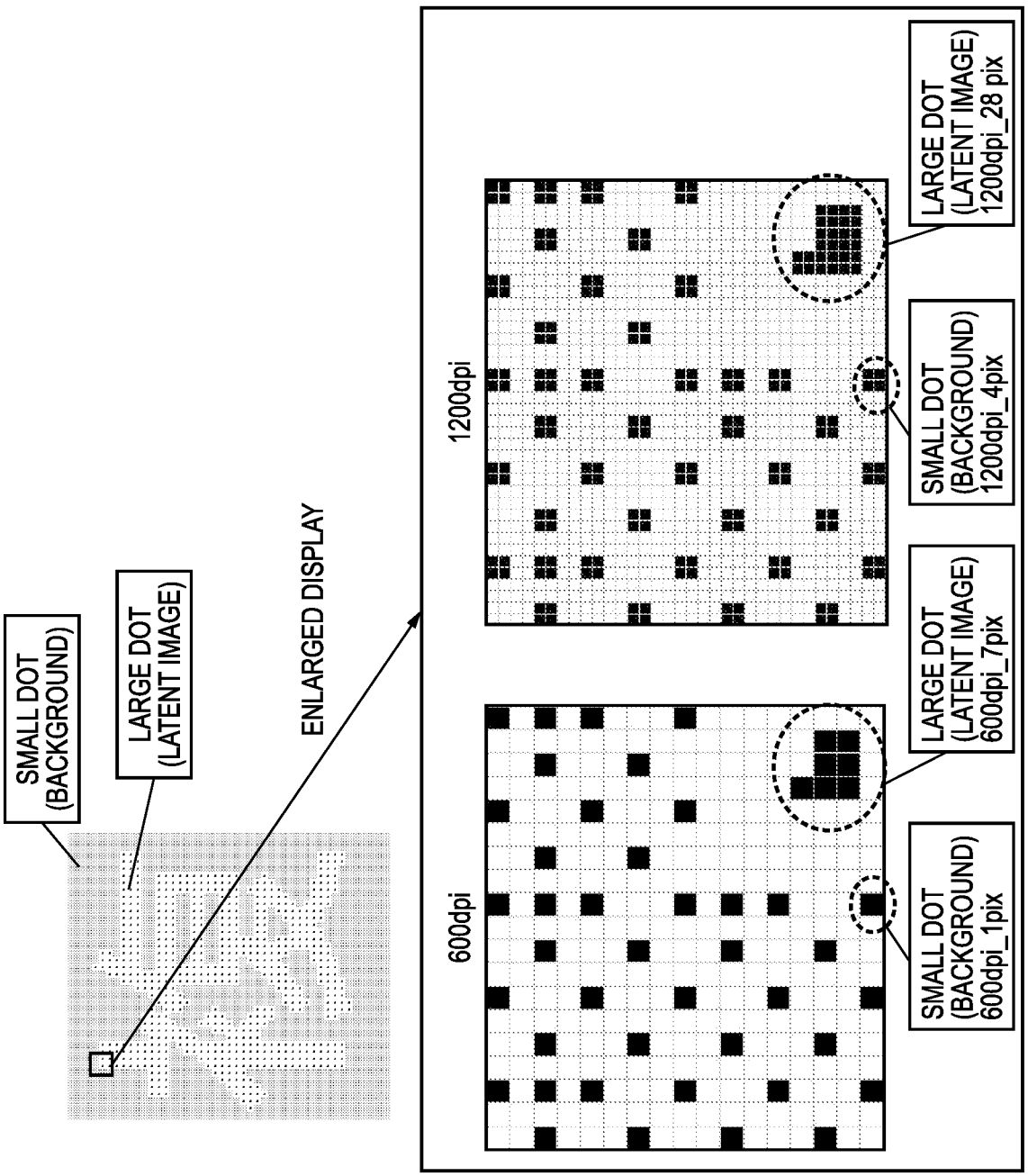
FIG. 8 depicts a view showing an example of copy-forgery-inhibited image data with an enlarged part in 600 dpi and 1,200 dpi.

FIG. 8 depicts a view showing an example of copy-forgery-inhibited image data with an enlarged part in 600 dpi and 1,200 dpi.

In FIG. 8, a small dot of copy-forgery-inhibited image data in 600 dpi is formed by one pixel in 600 dpi, and a large dot is formed by seven pixels in 600 dpi. In addition, a small dot of copy-forgery-inhibited image data in 1,200 dpi is formed by four pixels in 1,200 dpi, and a large dot is formed by 28 pixels in 1,200 dpi.

Upon receiving a document print instruction from the UI unit 204, the print data generation unit 209 generates print data corresponding to the document. At this time, if the copy-forgery-inhibited image composition instruction exists, print data with which the copy-forgery-inhibited image data received from the copy-forgery-inhibited image generation unit 208 is composited is generated.

The arrangement of the image forming apparatus 101 will be described next.

Figure 3:
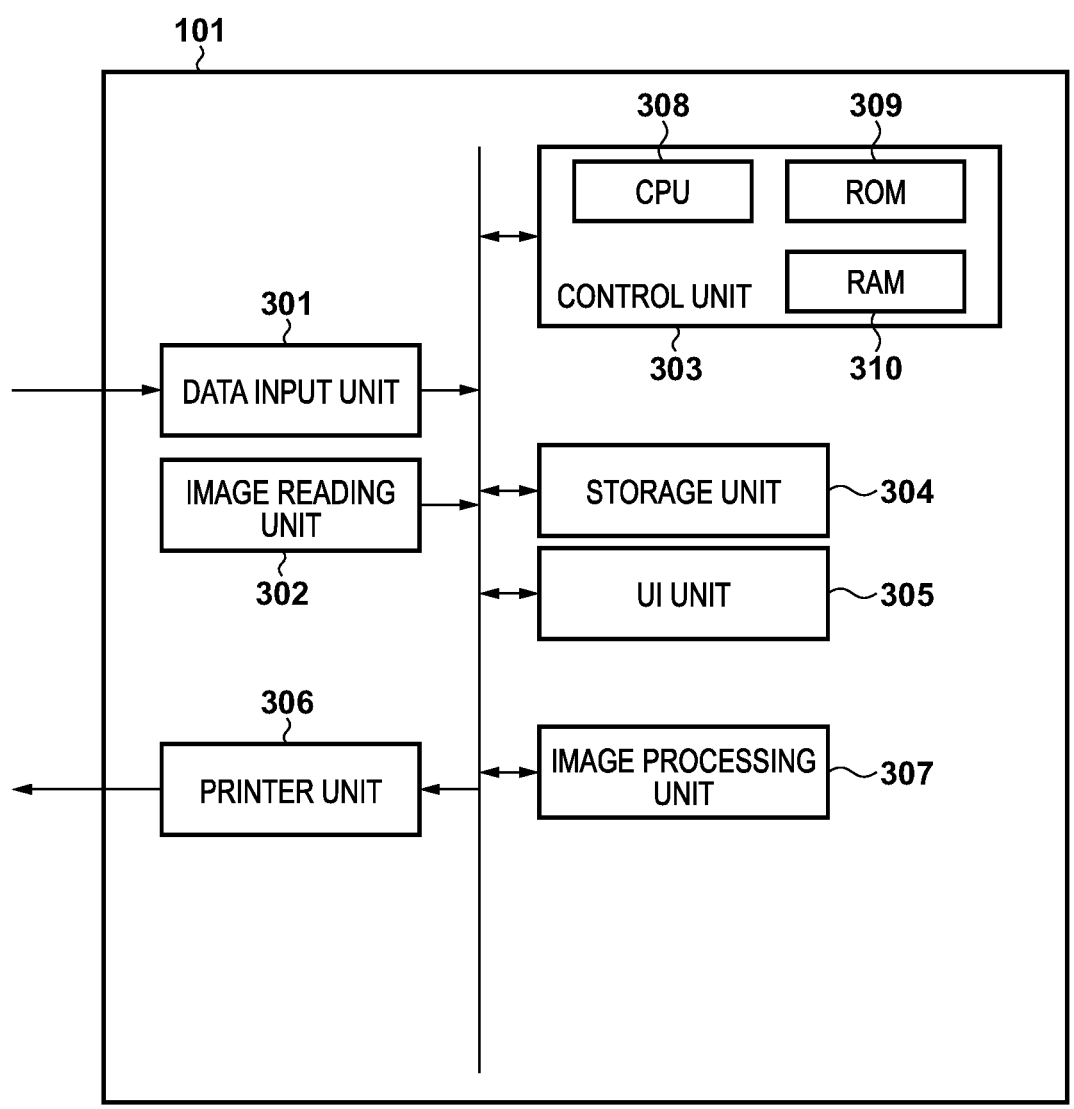
FIG. 3 is a block diagram for explaining the arrangement of the image forming apparatus according to the first embodiment.

FIG. 3 is a block diagram for explaining the arrangement of the image forming apparatus 101 according to the first embodiment.

The image forming apparatus 101 includes a data input unit (reception unit) 301, the image reading unit 302, a control unit 303, a storage unit 304, a UI unit 305, the printer unit 306, and an image processing unit 307. The data input unit 301 receives and inputs print data (including copy-forgery-inhibited image data) transmitted from, for example, the host computer 102 via the network 105. The image reading unit 302 includes a scanner, reads an image of an original, and outputs image data. The control unit 303 controls the operation of the image forming apparatus 101, and includes a CPU 308, a ROM 309, and a RAM 310. The CPU 308 executes a program stored in the ROM 309 to execute processing shown in each flowchart to be described later. The storage unit 304 is, for example, a hard disk drive (HDD) and can store a large capacity of data. The CPU 308 may be configured to deploy a program stored in the storage unit 304 into the RAM 310 and execute processing to be described later. The UI unit 305 includes an operation panel and a display unit, displays a message to a user, and receives an operation instruction by the user. Note that the UI unit 305 may have a touch panel function. The printer unit 306 is a printer engine and, here, forms an image on a sheet by an electrophotographic method. In the first embodiment, the printer unit 306 that has a print resolution of 600 dpi in the main scanning direction and the sub-scanning direction, and can finely divide the light emission timing of a light-emitting device such as a laser or an LED by PWM control will be described. However, the present invention is not limited to this. The image processing unit 307 performs image processing for image data included in the input print data. Note that the image processing unit 307 may be a processing unit such as specialized hardware, or the CPU 308 may implement the function of the image processing unit 307 by executing the above-described program.

Function setting in printing will be described next.

FIG. 5 depicts a view showing an example of a function setting screen displayed on the UI unit 305 of the image forming apparatus 101 according to the first embodiment. Note that the function setting screen may be displayed on the UI unit 204 by a printer driver or an application installed in the host computer 102.

In a list 502 of setting items, a list of setting items of functions that can be designated as options and current setting contents corresponding to the items are displayed. An item selected in the list 502 of setting items is displayed in a selected item 503, and its setting contents can be changed. Here, "resolution" is selected. In the resolution, fine and superfine can be selected. In the superfine setting, pseudo-high resolution conversion processing is applied. In the first embodiment, superfine (pseudo-high resolution) is (pseudo) 1,200 dpi (first resolution), and fine (normal resolution) is 600 dpi (second resolution). However, the present invention is not limited to this.

Note that when "halftone" is selected in the list 502 of setting items, the pattern of dither processing can be changed in accordance with the attribute signal (Text, Graphics, Image, or the like) of an object generated from information described in PDL. The default setting of "halftone" is "pattern 2", as shown in FIG. 5. In "pattern 2", a high-LPI (line per inch) dither matrix is assigned to Text attribute for which reproduction of details is important, and a low-LPI dither matrix is assigned to Graphics/Image attribute for which stable dot reproduction is important. By changing the pattern setting to another pattern, the combination of LPIs assigned to the attributes can be changed, the LPIs can be equalized for all the attributes, or error diffusion processing can be assigned.

The arrangement of the image processing unit 307 that performs image processing for image data included in input print data when the image forming apparatus 101 according to the first embodiment forms (prints) an image using the printer unit 306 will be described next.

Figure 4:
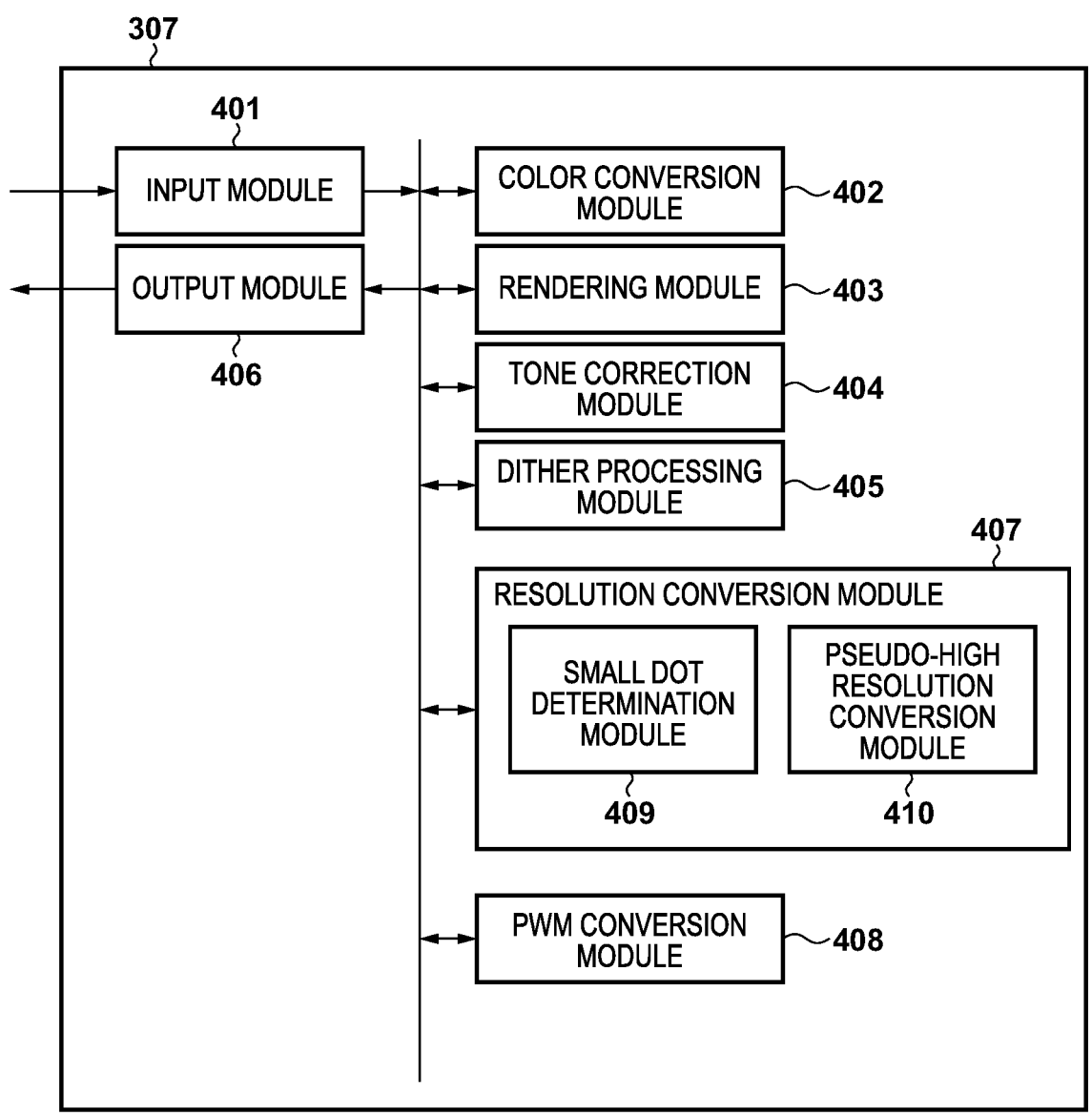
FIG. 4 is a block diagram for explaining the functional arrangement of the image processing unit of the image forming apparatus according to the first embodiment.

FIG. 4 is a block diagram for explaining the functional arrangement of the image processing unit 307 of the image forming apparatus 101 according to the first embodiment. Note that as described above, the function of the image processing unit 307 may be implemented by hardware, or the CPU 308 may implement the function of the image processing unit 307 by executing the above-described program.

The image processing unit 307 includes an input module 401, a color conversion module 402, a rendering module 403, a tone correction module 404, a dither processing module 405, an output module 406, a resolution conversion module 407, and a PWM (Pulse Width Modulation) conversion module 408.

The input module 401 receives, for example, image data described in PDL (Page Description Language) and included in print data received by the data input unit 301. The rendering module 403 performs rendering to convert the PDL data into RGB raster image data and supplies the raster image data to the color conversion module 402. Note that in the first embodiment, the rendering module 403 switches between fine (normal resolution) for generating image data at a resolution of 600 dpi in the main scanning direction and the sub-scanning direction, and superfine (pseudo-high resolution) for generating image data at a resolution of 1,200 dpi in the main scanning direction and the sub-scanning direction. These resolution settings can be done via the function setting screen shown in FIG. 5 described above, or are selected by a resolution instruction included in the print data received by the data input unit 301.

The color conversion module 402 performs color conversion from RGB to CMYK for the RGB raster image data supplied from the rendering module 403. Note that at this time, if copy-forgery-inhibited image data is included in the image data, the copy-forgery-inhibited image data is converted such that the single-color Max PWM signal of CMYK is compensated for after CMYK conversion. The tone correction module 404 performs tone correction of image data of each color plane in accordance with a printer density characteristic corresponding to a dither processing pattern applied to the halftone of the CMYK-converted image data. The dither processing module 405 performs dither processing for the image data of each color plane after the tone correction, thereby converting the image data into an N-ary halftone dot image pattern that expresses the halftone of the image data by area gradation.

In the first embodiment, in the fine (normal resolution) setting, image data is converted into a 16-valued halftone dot image pattern using a dither matrix for 600 dpi_4 bits output. In addition, in the superfine (pseudo-high resolution) setting, image data is converted into a binary halftone dot image pattern using a dither matrix for 1,200 dpi_1 bit output. However, the present invention is not limited to this. Note that since the copy-forgery-inhibited image data is not a halftone but a Max PWM signal, the pattern shape is maintained before and after the dither processing.

The resolution conversion module 407 operates when the resolution instruction indicates superfine (pseudo-high resolution). The resolution conversion module 407 converts image data after dither processing generated at a resolution of 1,200 dpi in the main scanning direction and the sub-scanning direction into image data having a resolution of 600 dpi in the main scanning direction and the sub-scanning direction, which is the same as the print resolution printable by the printer unit 306. Note that the resolution printable by the printer unit 306 is not limited to 600 dpi. For example, the resolution may be 1,200 dpi in the main scanning direction and 600 dpi in the sub-scanning direction. In this case, the resolution conversion module 407 executes resolution conversion only in the sub-scanning direction.

The resolution conversion module 407 includes a small dot determination module 409 and a pseudo-high resolution conversion module 410, which are the features of the first embodiment. For the 1,200-dpi image data after dither processing, the small dot determination module 409 analyzes a sampling position in resolution conversion as a target pixel (processing target pixel) on a rectangle basis, thereby determining whether it corresponds to a small dot. To detect a small dot in a copy-forgery-inhibited image, the dot determination is performed only for the color plane of the copy-forgery-inhibited image, thereby reducing the occurrence of a determination error in an image of original that is not the copy-forgery-inhibited image. In addition, to suppress a determination error of a small dot in a halftone dot image pattern portion by the above-described dither processing, screen processing capable of arbitrarily controlling the growing scheme of the halftone dot by a threshold matrix without using the halftone setting may be used in the list 502 of setting items shown in FIG. 5. The screen processing is performed by a dither method in which, for example, a threshold is read out from a dither matrix in which a plurality of thresholds are arranged, as shown in FIG. 9, and input image data and the threshold are compared, thereby converting the data into binary data.

Figure 9:
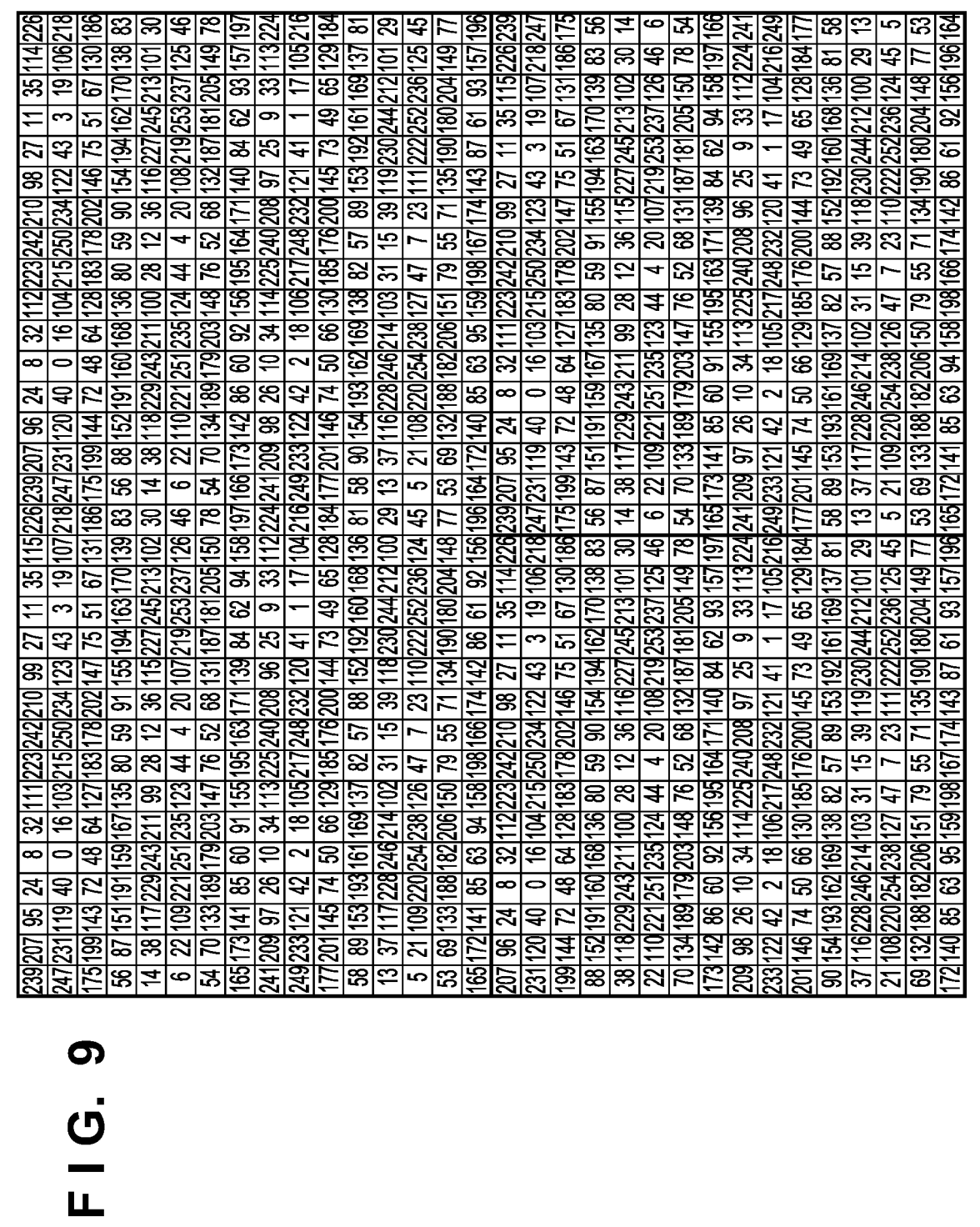

FIG. 9 depicts a view showing an example of a dither matrix of 1,200 dpi_1 bit.

Figure 10:
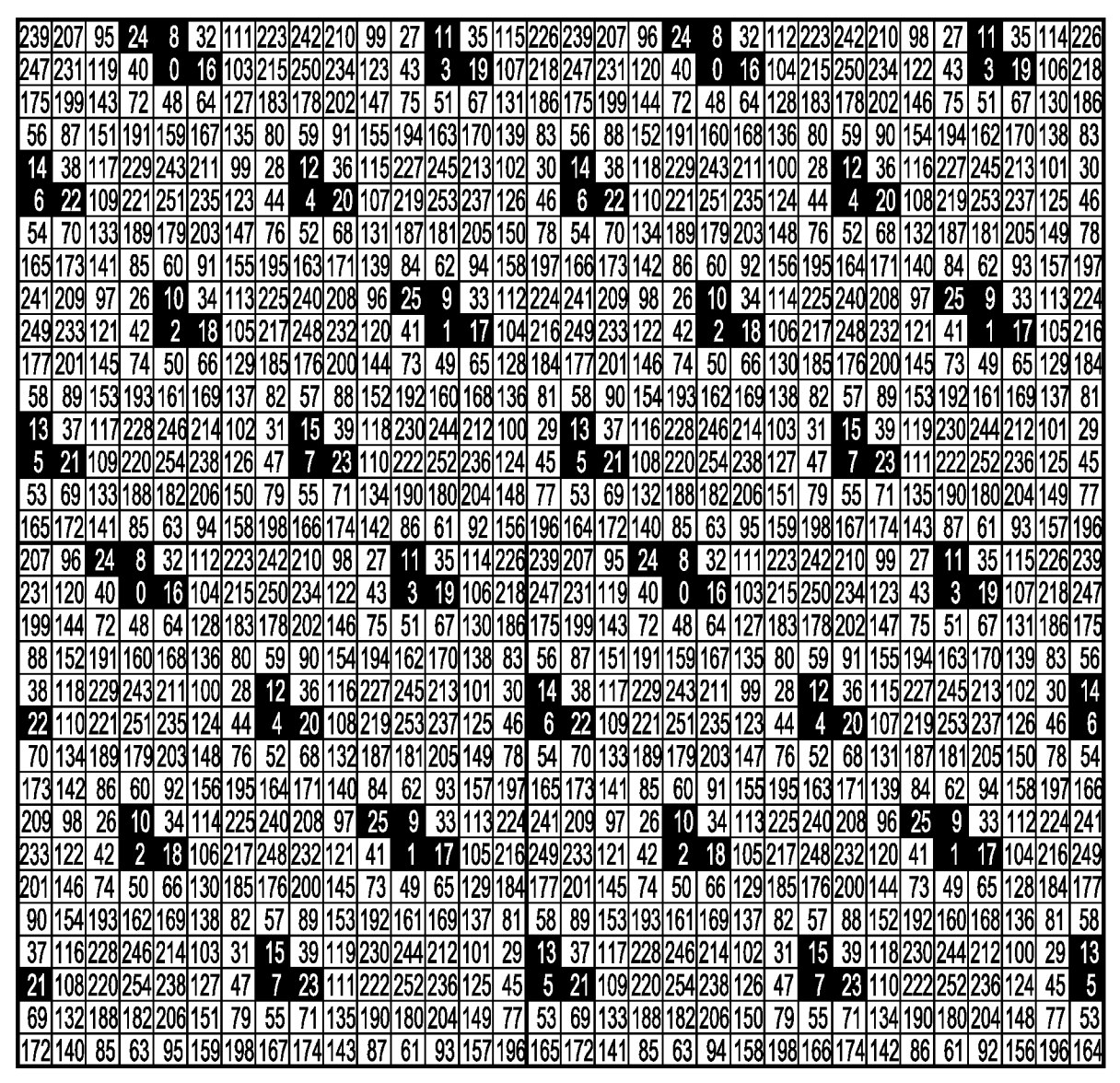

When the threshold of the growth of the halftone dot image pattern is finely adjusted in this way, control can be performed by threshold comparison with the input image so the shape of a small dot having a square shape of 2×2 pixels in 1,200 dpi is not generated by the halftone dot processing, as shown in FIG. 10.

FIG. 10 depicts a view showing an example in which small dots each including 2×2 pixels (square) are not generated by dither processing.

Figure 11C:
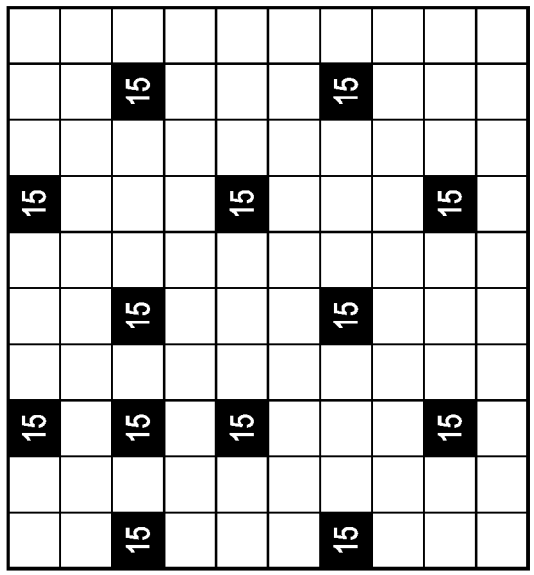
FIGS. 11A to 11C depict views showing input/output of pseudo-high resolution conversion processing for small dots.
Figure 11B:
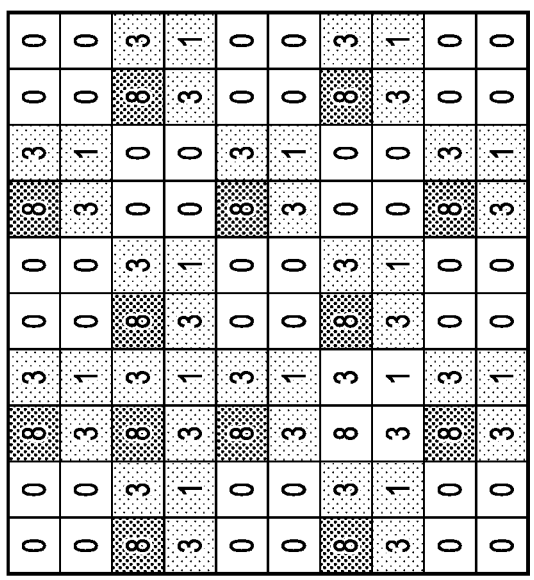
Figure 11A:
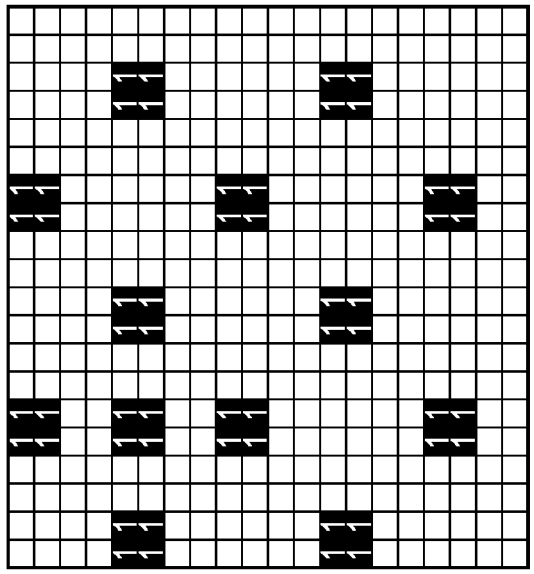

The pseudo-high resolution conversion module 410 performs resolution conversion by switching control of pseudo-high resolution conversion in the target pixel based on the determination result of the small dot determination module 409. More specifically, the product-sum operation coefficient of a processing rectangle in pseudo-high resolution conversion processing to be described later in detail is changed between a case of a small dot and a case of not being a small dot. In the case of not being a small dot, the pseudo-high resolution conversion processing is performed using a product-sum operation coefficient aiming at a spot-multiplexing effect. In the case of a small dot, importance is not attached to the spot-multiplexing effect, and a product-sum operation coefficient that makes the reproducibility of the normal resolution setting (600 dpi) close to that of the small dot is used. Alternatively, simple thinning is performed to normalize the data to the same bit depth as that after the pseudo-high resolution conversion processing. Otherwise, the value may be replaced with a pixel value (for example, a signal value "15") defined in advance for 600 dpi. Accordingly, for example, a small dot pattern of 1,200 dpi shown in FIG. 11A is conventionally converted as shown in FIG. 11B because of spot-multiplexing but can be converted as shown in FIG. 11C.

Details of the small dot determination module 409 and the pseudo-high resolution conversion module 410 in the resolution conversion module 407, which are the features of the first embodiment, will be described later.

The PWM conversion module 408 converts the image data of each color plane output from the resolution conversion module 407 into PWM signal data representing the exposure time period of a laser beam from a laser scanner unit (not shown) in the printer unit 306. The laser scanner unit exposes a photosensitive drum (not shown) in the printer unit 306 in accordance with the exposure time period converted based on the image data, thereby forming a latent image on the photosensitive drum. The output module 406 transfers the PWM signal data generated by the PWM conversion module 408 to the printer unit 306.

The operation of the small dot determination module 409 will be described next in detail with reference to FIGS. 12A to 12C.

FIGS. 12A to 12C depict views schematically showing small dot determination processing of the small dot determination module 409 according to the first embodiment.

Only when the resolution instruction included in print data is superfine ((pseudo) 1,200 dpi), the small dot determination module 409 performs small dot determination processing for the image data. The small dot determination module 409 then supplies a flag representing the result of the small dot determination to the pseudo-high resolution conversion module 410.

FIG. 12A depicts a view showing the relationship between image data and a processing rectangle in small dot determination processing. FIG. 12A shows an example in which image data 1201 of 1,200 dpi input to the small dot determination module 409 and a processing rectangle 1204 formed by 16 pixels including a target pixel (processing target pixel) 1203 are adapted. In the small dot determination processing, the processing rectangle 1204 is moved at a sampling interval corresponding to the reduction ratio of the pseudo-high resolution conversion module 410 while defining a pixel at a sampling position 1202 (a position indicated by hatching in FIG. 12A) as the target pixel 1203. Pattern matching between the input image data 1201 of the processing rectangle 1204 and a small dot pattern 1205 shown in FIG. 12B is performed. If the processing rectangle 1204 matches the small dot pattern 1205, a small dot presence flag is returned. If the patterns do not match, a small dot absence flag is returned. Note that the size of the processing rectangle 1204 shown in FIG. 12A and the small dot pattern 1205 shown in FIG. 12B are merely examples, and the present invention is not limited to these.

Note that to detect a small dot of a copy-forgery-inhibited image, pattern matching with the small dot pattern 1205 may be performed only for the color plane of the copy-forgery-inhibited image. Additionally, in a copy-forgery-inhibited image portion that overlaps the original and has mixed colors, the coincidence of density between large dots and small dots of the copy-forgery-inhibited image cannot be compensated for. Hence, in this case, color planes other than the color plane of the copy-forgery-inhibited image are plain, or pattern matching may be performed using a plain pattern 1206 shown in FIG. 12C. In this case, for example, in a case in which the K (black) plane is a color plane of the copy-forgery-inhibited image, when small dots exist in the K plane, and the CMY planes are plain, a (single-color) small dot presence flag is returned. Otherwise, a (single-color) small dot absence flag is returned.

Additionally, in the first embodiment, the position to start sampling of the target pixel 1203 in the small dot determination processing is set to the origin coordinates (0, 0) at the upper left corner of the image. However, the present invention is not limited to this. When a coordinate calculation error at the time of rendering, a page phase shift, image rotation processing, padding (not shown) to handle data in units of 32 bits, and the like are involved in the image data before resolution conversion by the resolution conversion module 407, the phase of the small dot pattern of the input image data 1201 may change. To prevent this, the sampling start phase of the target pixel 1203 is shifted in accordance with the phase of the small dot of the input image data 1201 input to the small dot determination module 409, and the small dot determination processing is then performed. Note that the sampling start phase in the pseudo-high resolution conversion module 410 as post-processing can be controlled independently.

More specifically, when image data 1501 shown in FIG. 15A is rotated by 180°, image data 1502 shown in FIG. 15B is obtained.

FIGS. 15A to 15C depict views for explaining the relationship between small dot determination processing and image data in the first embodiment.

The image size of the image data 1501 shown in FIG. 15A in the sub-scanning direction is an odd size. For this reason, when the image data 1501 is rotated by 180°, as shown in FIG. 15B, the phase of the small dot changes from (2, 2) to (2, 1), and it is found that the phase is shifted in the sub-scanning direction. Hence, as shown in FIG. 15C, the sampling start phase is offset from the origin (0, 0) to (0, 1) to obtain a sampling position 1503, thereby performing phase matching between the small dot of the processing rectangle 1204 and the small dot pattern 1205 shown in FIG. 12B. Here, the sampling start phase is controlled in accordance with the phase of the small dot, as described above. However, the method of phase matching of the small dot is not limited to this. For example, for a phase shift in the sub-scanning direction, it may be determined whether the size of a processing rectangle 1301 shown in FIG. 13A matches one of small dot patterns shown in FIGS. 13B to 13D.

FIGS. 13A to 13H depict views for explaining the relationship between small dot determination processing and image data in the embodiment.

The operation of the pseudo-high resolution conversion module 410 will be described next in detail with reference to FIGS. 14A to 14F.

FIGS. 14A to 14F depict views schematically showing pseudo-high resolution conversion processing by the pseudo-high resolution conversion module 410 according to the first embodiment.

Only when the resolution instruction included in print data is superfine ((pseudo) 1,200 dpi), the pseudo-high resolution conversion module 410 performs pseudo-high resolution conversion processing for the image data. As a result, the pseudo-high resolution conversion module 410 converts the image data having a resolution of 1,200 dpi in both the main scanning direction and the sub-scanning direction into image data having a resolution of 600 dpi in both the main scanning direction and the sub-scanning direction.

FIG. 14A depicts a view showing the relationship between image data and a processing rectangle in the pseudo-high resolution conversion processing. FIG. 14A shows the relationship between image data 1401 of 1,200 dpi input to the pseudo-high resolution conversion module 410 and a processing rectangle 1404 formed by nine pixels with a target pixel (processing target pixel) 1403 at the center.

The pseudo-high resolution conversion processing is performed by performing sampling while moving the processing rectangle 1404 in accordance with the reduction ratio and performing a product-sum operation (see FIGS. 14B to 14F) in the region of the processing rectangle 1404. In the product-sum operation, the product-sum operation coefficient (see FIGS. 14C to 14F) is switched based on a small dot determination result flag supplied from the small dot determination module 409.

In the first embodiment, the start position of sampling of the target pixel 1403 in the pseudo-high resolution conversion processing is set to the origin coordinates (0, 0) at the upper left corner of the image, as in the small dot determination. However, the present invention is not limited to this. When a page phase shift, image rotation processing, padding (not shown) to handle data in units of 32 bits, and the like are involved in the image data before resolution conversion by the resolution conversion module 407, the phase of the halftone dot image generated by the dither processing module 405 may change from the state immediately after dither processing. To prevent this, the start phase of the target pixel 1403 is shifted in accordance with the growth start phase of the halftone dot image input to the pseudo-high resolution conversion module 410, thereby performing the pseudo-high resolution conversion processing.

Note that in the pseudo-high resolution conversion processing according to the first embodiment, the resolution of the input image data in the main scanning direction and the sub-scanning direction is converted from 1,200 dpi to 600 dpi. Hence, the processing rectangle 1404 is processed while sequentially moving the target pixel 1403 to a sampling position 1402 (the position indicated by hatching in FIG. 14A) that moves to every other pixel in the main scanning direction and the sub-scanning direction in the image data 1401 of 1,200 dpi. The sampling position is the position of a pixel as the processing target when performing pseudo-high resolution conversion processing, and arranged at an interval of every other pixel in the first embodiment. The arrangement interval of the sampling position 1402 is called a sampling interval. The sampling interval is decided by the reduction ratio of the resolution in the main scanning direction and the sub-scanning direction. In the first embodiment, resolution conversion from 1,200 dpi to 600 dpi is performed in both the main scanning direction and the sub-scanning direction. For this reason, the sampling interval is 2 (=1200/600) pixels, that is, every other pixel.

Next, FIG. 14B depicts a view showing an example of the processing rectangle 1404 of the product-sum operation. In the first embodiment, the processing rectangle 1404 of the product-sum operation includes 3×3=9 pixels. However, the present invention is not limited to this. In addition, FIG. 14C depicts a view showing product-sum operation coefficients in the processing rectangle 1404 used for the product-sum operation.

As described above, the processing rectangle 1404 is formed by a total of nine pixels with the target pixel 1403 at the center. Product-sum operation coefficients 1405 are nine coefficients a corresponding to the nine pixels of the processing rectangle 1404. Let (i,j) be the coordinates of the target pixel 1403, and I(i,j) be the value of the pixel. As the result of the product-sum operation, an output OUT is obtained by $$\mathrm{OUT} = \frac{15}{\sum_{k=-1}^{1}\sum_{l=-1}^{1} a_{(k,l)}} \sum_{k=-1}^{1}\sum_{l=-1}^{1} I_{(i+k,j+l)} a_{(k,l)} \quad (1)$$

That is, since the value I(i,j) of the pixel is one of two values "0" and "1", products of the values of the nine pixels of the processing rectangle 1404 and the product-sum operation coefficients 1405 corresponding to the coordinates are added, and the output OUT is normalized to 15. This makes it possible to change the number of tones of the image data from two to 16 while converting the resolution of the image data from 1,200 dpi to 600 dpi.

FIGS. 14D, 14E, and 14F show examples of product-sum operation coefficients in the first embodiment. For example, when the product-sum operation is performed using product-sum operation coefficients 1406 shown in FIG. 14D, the spot-multiplexing effect can be obtained, and the image data can be printed at a resolution higher than the actual resolution. An image corresponding to 1,200 dpi can be formed using the image data of 600 dpi. Hence, even the printer unit 306 having only a capability for a print resolution of 600 dpi can print the image of a character or line corresponding to 1,200 dpi.

For example, in a case in which product-sum operation coefficients 1407 shown in FIG. 14E are used, since only the target pixel 1403 is used in the product-sum operation, the same result as simple thinning can be obtained. Furthermore, in a case in which product-sum operation coefficients 1408 shown in FIG. 14F are used, an intermediate effect between the product-sum operation coefficients 1406 and the product-sum operation coefficients 1407 can be obtained.

Note that in the first embodiment, a plurality of product-sum operation coefficients are provided, and the product-sum operation coefficients are switched based on a small dot determination result flag at the sampling position supplied from the small dot determination module 409. For example, if the small dot determination result flag indicates small dot absence, the operation aims at the spot-multiplexing effect using the product-sum operation coefficients 1406. On the other hand, if the small dot determination result flag indicates small dot presence, the product-sum operation coefficients 1407 or 1408 are used. This implements small dot reproduction close to that in a case in which printing is performed at the normal resolution (600 dpi).

A processing procedure by each image processing of the image processing unit 307 described with reference to FIG. 4 will be described next.

FIG. 6 is a flowchart for describing processing by the image processing unit 307 according to the first embodiment. This processing is achieved when the CPU 308 deploys a program stored in the storage unit 304 into the RAM 310 and executes it. Here, a description will be made assuming that the entity of each process is a corresponding portion in FIG. 4. In addition, this processing is executed in both a case in which fine is set as the resolution and a case in which superfine is set.

In step S601, the CPU 308 inputs document data included in image data received by the data input unit 301 to the input module 401 and supplies it to the rendering module 403. Accordingly, when fine is set, the rendering module 403 converts the supplied document data into RGB raster image data having a resolution of 600 dpi in both the main scanning direction and the sub-scanning direction. The converted raster image data is supplied to the color conversion module 402. In addition, when superfine is set, the rendering module 403 converts the supplied document data into RGB raster image data having a resolution of 1,200 dpi in both the main scanning direction and the sub-scanning direction, and supplies it to the color conversion module 402.

Next, the process advances to S602, the color conversion module 402 performs color conversion from the RGB raster image data to CMYK image data, and supplies the CMYK image data to the tone correction module 404. Next, the process advances to S603, and the tone correction module 404 performs tone correction processing for the image data of each color plane in consideration of the tone characteristic of the printer unit 306 for the pattern of dither processing applied to the halftone of the image data. Furthermore, the tone correction module 404 supplies the image data that has undergone the tone correction processing to the dither processing module 405. Tone correction processing in this case is processing of correcting the value of each pixel of the image data in advance such that a desired output result (the gradation (tone) of the printed product) is obtained from the printer unit 306. Note that since the tone characteristic of the printer unit 306 varies depending on the pattern of dither processing, the contents of the tone correction processing need to be changed in accordance with the pattern of dither processing. In the first embodiment, the contents of the tone correction processing are changed in accordance with the setting of halftone/resolution.

Next, the process advances to S604, and the dither processing module 405 executes dither processing using a dither matrix for the CMYK image data after tone correction, and supplies the image data (N-ary halftone dot image pattern) after the dither processing to the resolution conversion module 407. Here, when fine is set, the dither processing module 405 uses a dither matrix for 600 dpi_4 bits output. When superfine is set, the dither processing module 405 uses a dither matrix for 1,200 dpi_1 bit output.

Next, the process advances to S605, and the CPU 308 discriminates whether superfine is set. If superfine is not set (fine is set), the process skips step S606 and advances to step S607. More specifically, the resolution conversion module 407 supplies the supplied image data (600 dpi_4 bits) after the dither processing directly to the PWM conversion module 408.

On the other hand, if superfine is set, the process advances to step S606, and the resolution conversion module 407 converts the supplied image data (1,200 dpi_1 bit) after the dither processing into image data having a resolution of 600 dpi in both the main scanning direction and the sub-scanning direction. At this time, the number of bits of the image data after conversion is four. Then, the resolution conversion module 407 supplies the converted image data (600 dpi_4 bits) to the PWM conversion module 408. Note that the detailed procedure of resolution conversion in step S606 will be described later with reference to FIG. 7.

Next, process advances to S607, and the PWM conversion module 408 converts the supplied image data into PWM signal data and supplies the PWM signal data to the output module 406. The output module 406 transmits the supplied PWM signal data to the printer unit 306. After that, the processing ends.

The processing procedure by the resolution conversion module 407 will be described next.

Figure 7:
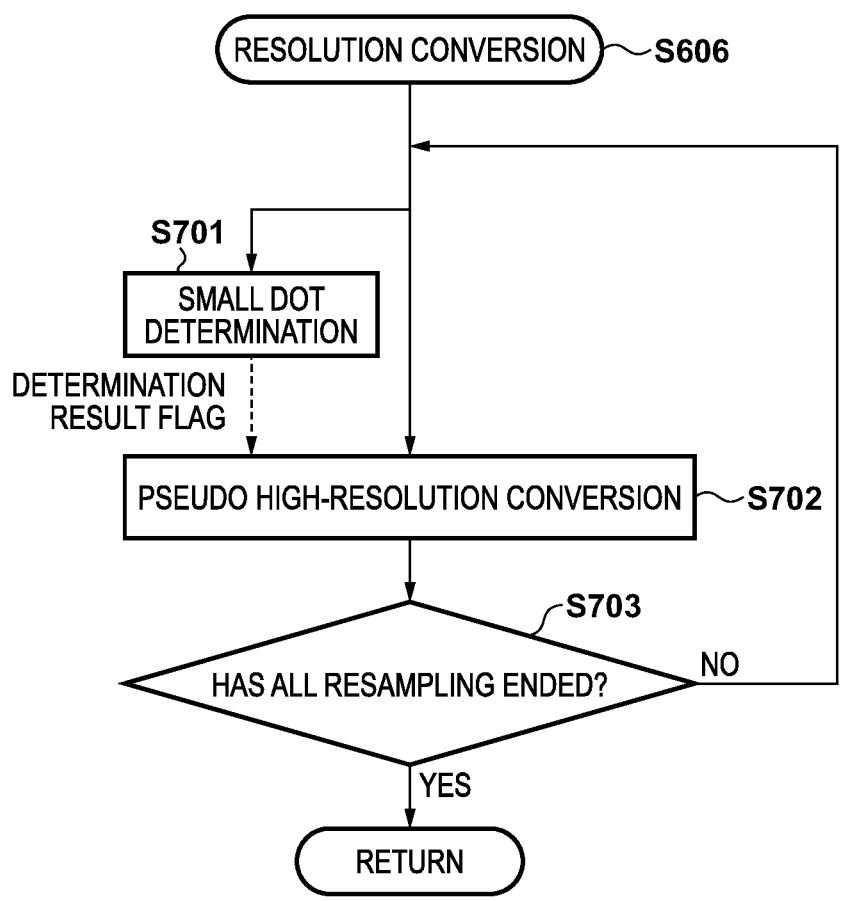
FIG. 7 is a flowchart for describing resolution conversion processing by a resolution conversion module in step S606 of FIG. 6.

FIG. 7 is a flowchart for describing resolution conversion processing by the resolution conversion module 407 in step S606 of FIG. 6. This processing is executed only when superfine is set as the resolution.

First, in step S701, the small dot determination module 409 performs the above-described small dot determination for the image data (1,200 dpi_1 bit) after dither processing supplied from the dither processing module 405, and generates a small dot determination result flag. The generated small dot determination result flag is supplied to the pseudo-high resolution conversion module 410. Next, the process advances to S702, and the resolution conversion module 407 performs the above-described pseudo-high resolution conversion processing for the image data (1,200 dpi_1 bit) after dither processing supplied from the dither processing module 405 based on the small dot determination result flag supplied from the small dot determination module 409. The image data is thus converted into image data (600 dpi_4 bits) having the same resolution as the print resolution. After that, the process advances to S703, and the resolution conversion module 407 determines whether sampling has completely ended. If sampling has not ended, the process returns to S701. If sampling has ended, the processing ends.

As described above, according to the first embodiment, a spot-multiplexing effect is obtained for a superfine (1,200 dpi) document, and even the printer unit having only a capability for a print resolution of 600 dpi can print the image of a character or line corresponding to 1,200 dpi. In addition, a small dot pattern used in a copy-forgery-inhibited image or the like can be printed by the same reproduction performance as fine (600 dpi).

Second Embodiment

In the above-described first embodiment, an example in which in the pseudo-high resolution setting, small dot determination of finding a small dot generated by the copy-forgery-inhibited image generation unit 208 from halftone dot image data after dither processing is performed, and resolution conversion is performed based on the small dot determination result has been described.

In the second embodiment, however, as described in Japanese Patent Laid-Open No. 2013-236180, misregistration correction according to the bending characteristic of a laser scanner provided in a printer unit is executed before resolution conversion by the resolution conversion module. An example in which small dot determination is then performed for halftone dot image data after dither processing, and resolution conversion is performed based on the determination result will be described. Note that the second embodiment is different from the above-described first embodiment only in some components of an image processing unit 307, a small dot determination module 409, and a pseudo-high resolution conversion module 410. Hence, the same reference numerals as in the above-described first embodiment denote the same parts in the second embodiment, and a description thereof will be omitted. Only different parts will be described below.

Figure 16:
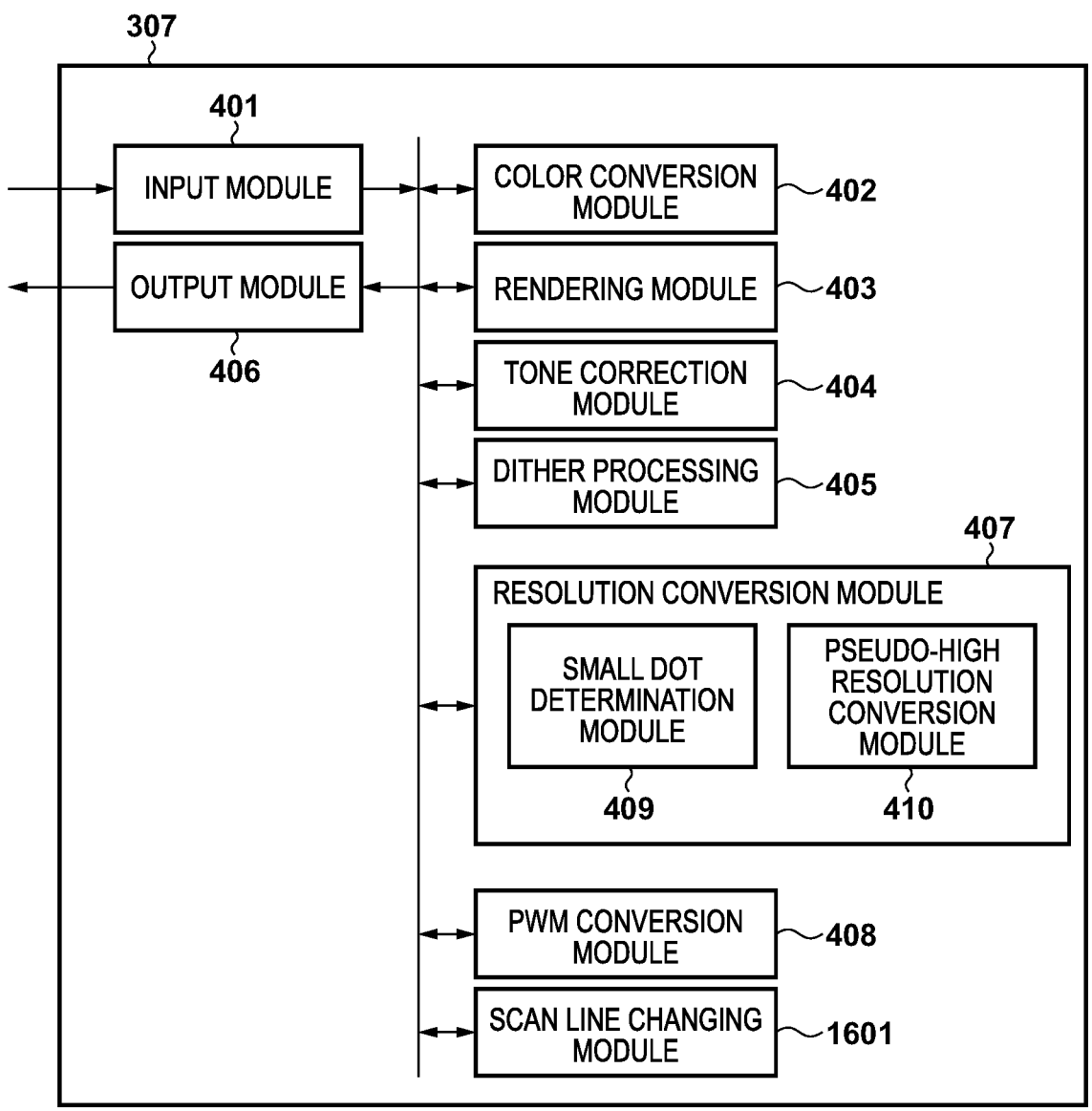
FIG. 16 is a block diagram for explaining the functional arrangement of the image processing unit of an image forming apparatus according to a second embodiment.

FIG. 16 is a block diagram for explaining the functional arrangement of the image processing unit 307 of an image forming apparatus 101 according to the second embodiment. The same reference numerals as in FIG. 4 of the first embodiment denote the same parts in FIG. 16, and a description thereof will be omitted. The image processing unit 307 further includes a scan line changing module 1601, as compared to the first embodiment. Note that the function of the image processing unit 307 may be implemented by hardware, or a CPU 308 may implement the function by executing a program, as described in the first embodiment.

The scan line changing module 1601 performs correction of a characteristic reverse to the bending characteristic of the scan line of the laser beam of each color of a printer unit 306 for image data before resolution conversion in the image processing unit 307 such that the printer unit 306 straightly prints the image data.

Figures 17A, 17B, 17C:
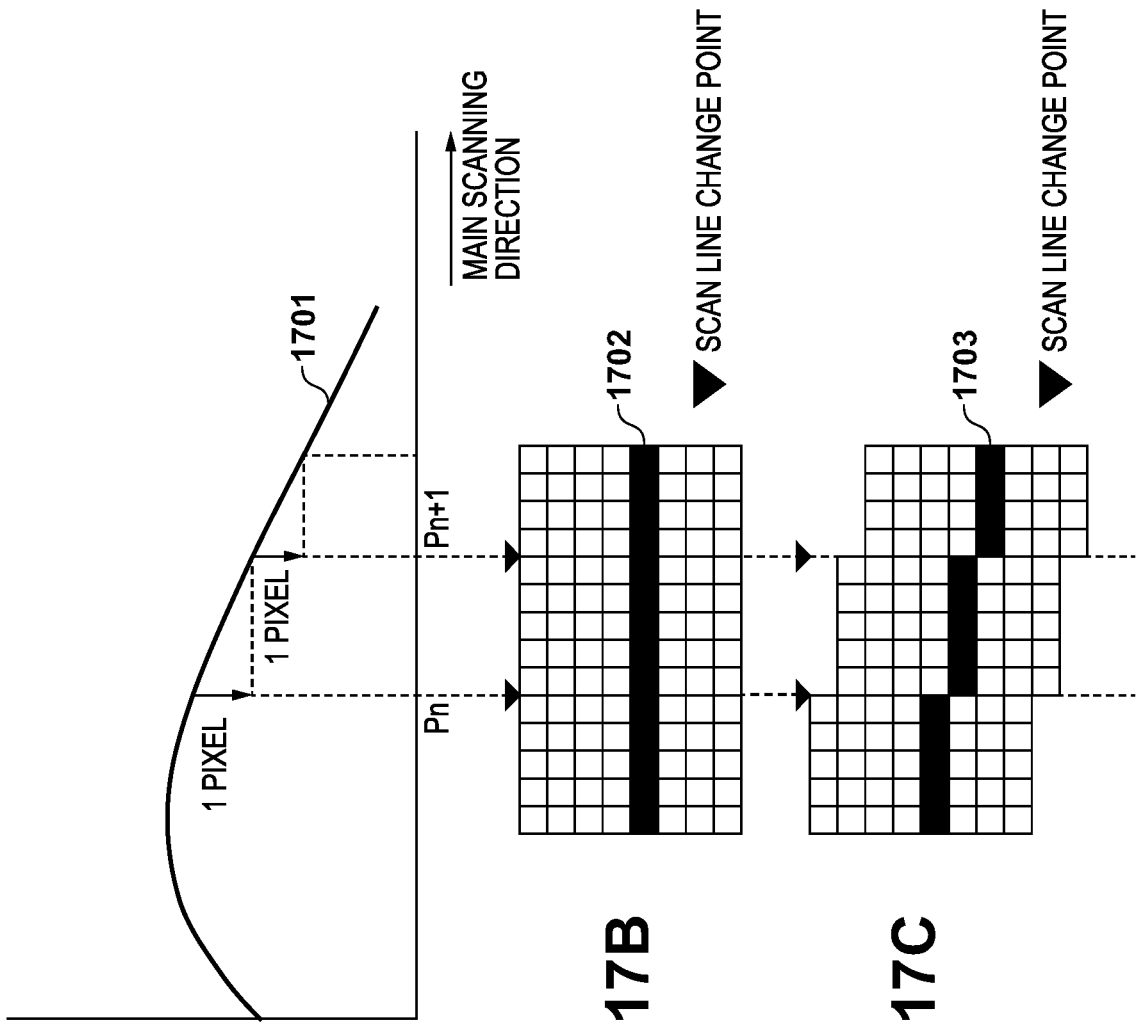
FIGS. 17A to 17C depict views for explaining a scan line changing process according to the second embodiment.

FIGS. 17A to 17C depict views for explaining a scan line changing process according to the second embodiment.

For example, FIG. 17A shows a shift correction amount 1701 in the sub-scanning direction according to a main scanning position for the bending characteristic of the scan line of a laser beam. As shown in FIGS. 17B and 17C, line shift (scan line changing process) corresponding to one pixel is performed in the sub-scanning direction at a main scanning position (scan line changing point) where the correction amount varies by one pixel. More specifically, for a line 1702 shown in FIG. 17B, line shift corresponding to one pixel is executed in the sub-scanning direction at the positions of scan line changing points Pn and Pn+1 by the scan line changing process. As a result, a line 1703 after the scan line changing as shown in FIG. 17C is obtained. Note that in the second embodiment, the scan line changing process is executed for halftone dot image data generated by a dither processing module 405. However, the present invention is not limited to this, and the scan line changing process may be performed at a stage before dither processing.

The operation of the small dot determination module 409 according to the second embodiment will be described next in detail with reference to FIGS. 13A to 13H described above.

As described above, in the second embodiment, the scan line changing process is executed for high-resolution image data before resolution conversion of the resolution conversion module 407. Since the phase in the sub-scanning direction is changed by the scan line changing process in accordance with the main scanning position, a phase change or shape change of a small dot may occur.

Figure 13A:
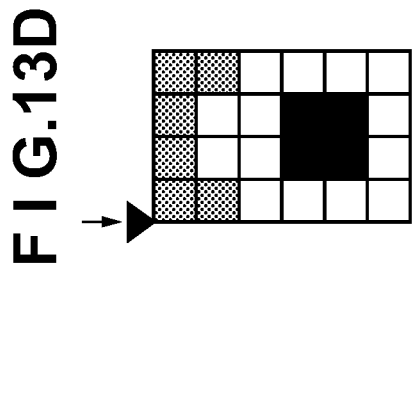
FIGS. 13A to 13H depict views for explaining the relationship between small dot determination processing and image data in the embodiment.
Figure 13B:
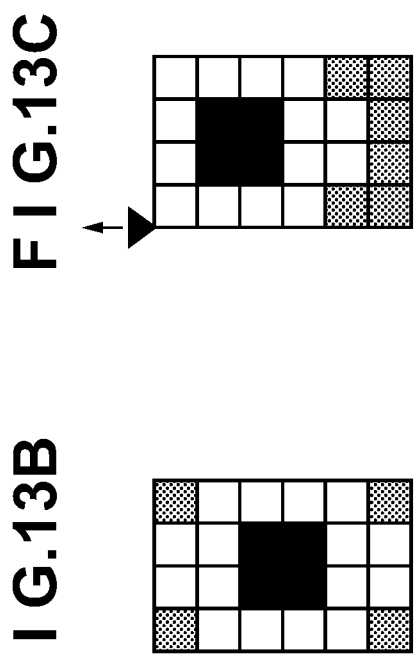
Figure 13C:
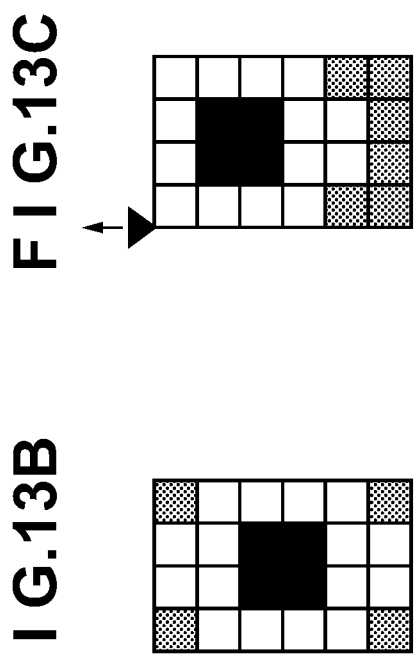
Figure 13D:
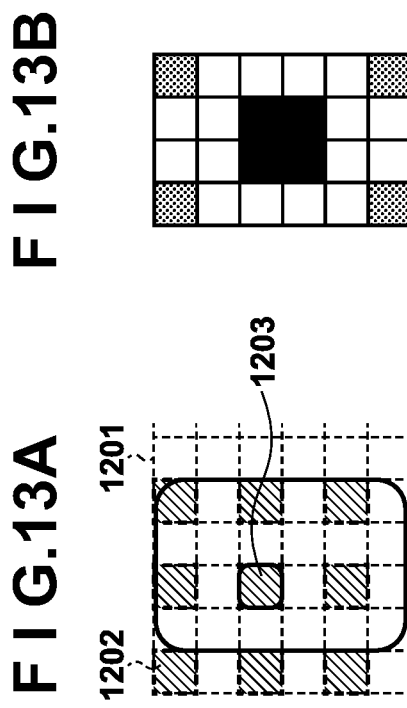
Figure 13E:
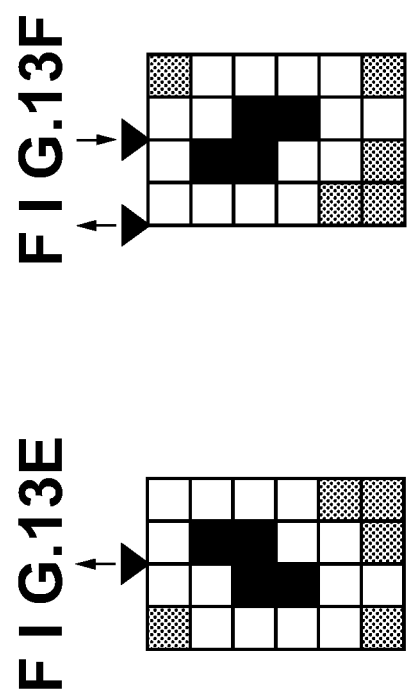
Figure 13F:
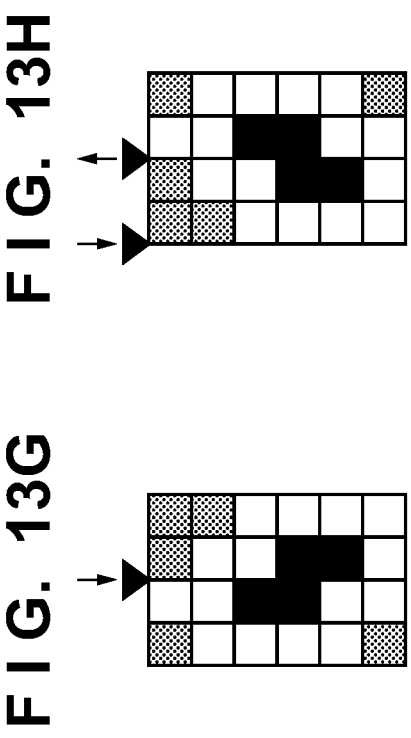
Figure 13G:
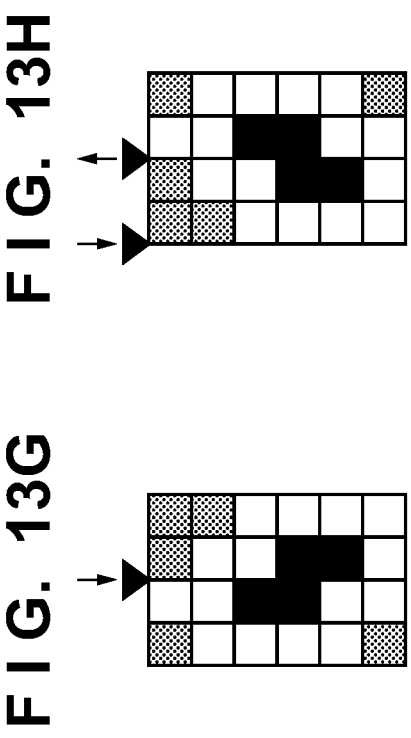
Figure 13H:
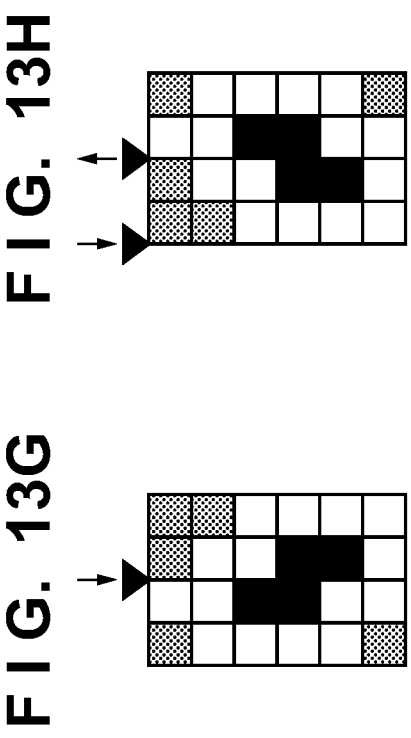

Hence in the small dot determination according to the second embodiment, a processing rectangle 1301 formed by 24 pixels, as shown in FIG. 13A, is used. Additionally, it is determined whether the processing rectangle matches one of the patterns shown in FIGS. 13B to 13H considering a phase change or shape change of a small dot by the scan line changing process.

Note that the shaded portions in FIGS. 13B to 13H represent indefinite pixels which can be either black or white. Additionally, in copy-forgery-inhibited image printing, even if the shape of a small dot changes at a local position in the main scanning direction, the evenness of the densities of the background part and the latent-image part is not greatly affected. Hence, pattern matching may be performed only in FIGS. 13B to 13D in which only the phase shift of the small dot is taken into consideration.

The operation of the pseudo-high resolution conversion module 410 according to the second embodiment will be described next in detail with reference to FIGS. 13A to 13H.

In the second embodiment, the small dot determination module 409 performs pattern matching using patterns including those shown in FIGS. 13B to 13H in consideration of a phase change or shape change caused by the scan line changing process. Note that when the pattern matches that shown in FIG. 13D or FIG. 13H, it is determined that a small dot exists. Unlike a case in which matching with another small dot pattern is performed, a target pixel 1203 is white. For this reason, if resolution conversion is performed using a product-sum operation coefficient that attaches importance to the target pixel, as in the first embodiment, the small dot disappears, and a characteristic different from that in a case of performing printing at the normal resolution (600 dpi) is obtained.

In a case in which small dot determination is executed by the method shown in FIGS. 13A to 13H, if the small dot determination result flag indicates small dot presence, image data is output by replacing the pixel value with a predetermined pixel value (for example, 15), instead of switching the product-sum operation coefficient and performing pseudo-high resolution conversion processing.

Figure 18:
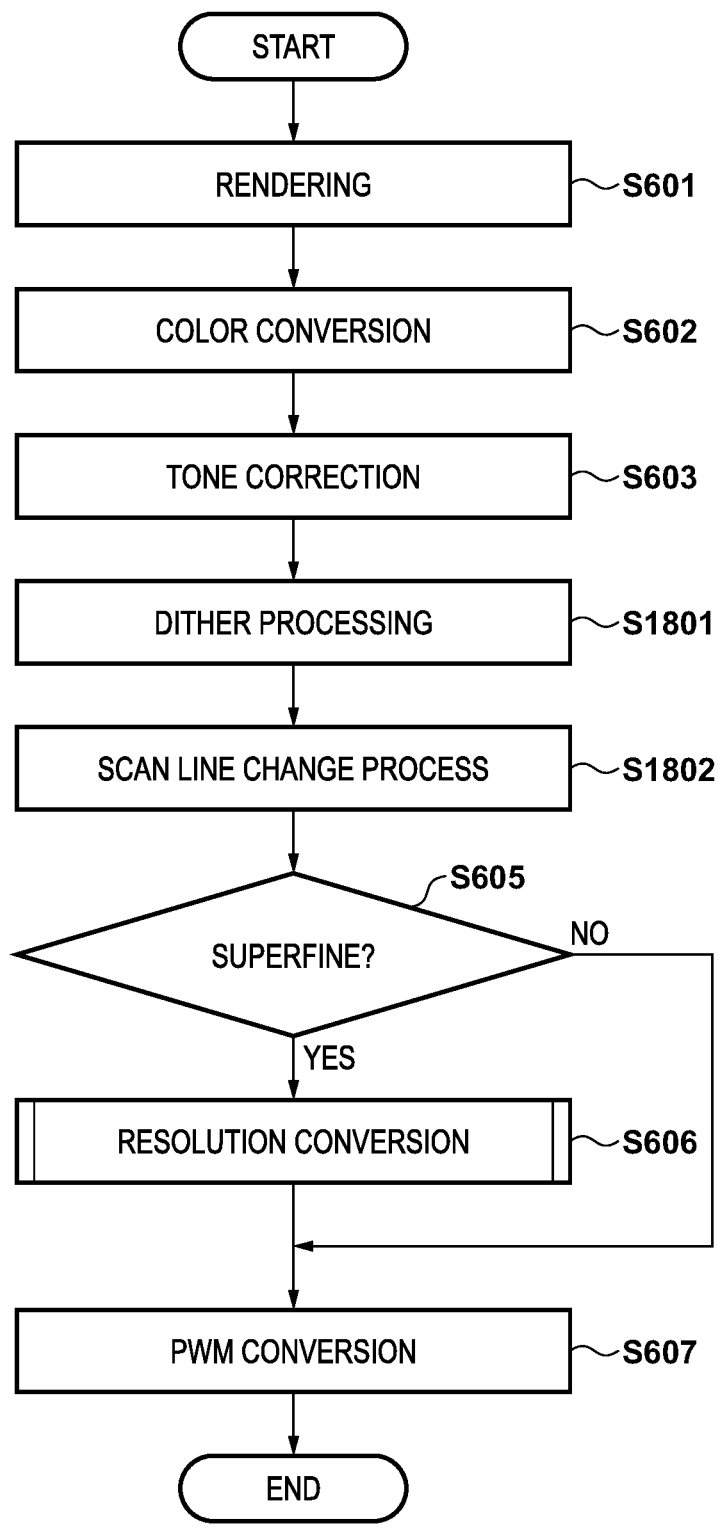
FIG. 18 is a flowchart for describing processing by the image processing unit according to the second embodiment.

FIG. 18 is a flowchart for describing processing by the image processing unit 307 according to the second embodiment. This processing is achieved when a CPU 308 deploys a program stored in a storage unit 304 into a RAM 310 and executes it. Here, a description will be made assuming that the entity of each process is a corresponding portion in FIG. 4. Note that the same step numbers as in the flowchart of FIG. 6 described above denote the same processes, and a description thereof will be omitted.

First, in step S1801, the dither processing module 405 performs dither processing using a dither matrix for CMYK image data after tone correction, and supplies the image data (N-ary halftone dot image pattern) after the dither processing to the scan line changing module 1601. Here, when fine is set, the dither processing module 405 uses a dither matrix for 600 dpi_4 bits output. When superfine is set, the dither processing module 405 uses a dither matrix for 1,200 dpi_1 bit output. Next, the process advances to S1802, and the scan line changing module 1601 executes the above-described scan line changing process for the supplied image data after the dither processing. After that, the image data that has undergone the scan line changing process is supplied to the resolution conversion module 407.

As described above, according to the second embodiment, in superfine, even when misregistration correction according to the bending characteristic of the laser scanner is executed before resolution conversion, the small dot pattern used in a copy-forgery-inhibited image or the like can be printed by the same reproduction performance as fine.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-29050, filed Feb. 21, 2018, which is hereby incorporated by reference herein in its entirety.

What is claimed is:

1. An image processing apparatus for converting image data of a first resolution into image data of a second resolution lower than the first resolution, the image processing apparatus comprising:

a controller, having at least one processor which executes instructions stored in a memory, one or more circuitry, or, a combination of the at least one processor and the one or more circuitry, being configured to:
- determine whether a target pixel in the image data of the first resolution constitutes a predetermined dot by determining whether an area including the target pixel matches a predetermined dot pattern; and
- convert a resolution of the image data from the first resolution to the second resolution by applying first coefficients to pixels of an area including a target pixel determined not to constitute the predetermined dot, and applying second coefficients different from the first coefficients to pixels of an area including a target pixel determined to constitute the predetermined dot.

2. The apparatus according to claim 1, wherein, in the determination, the controller adapts a processing rectangle to the image data of the first resolution, and determines whether the target pixel constitutes the predetermined dot based on whether pixels of the image data of the first resolution included in the processing rectangle matches the predetermined dot pattern.

3. The apparatus according to claim 2, wherein, in the determination, the controller shifts, in accordance with a start phase of the predetermined dot, a position of the image data of the first resolution to which the processing rectangle is adapted, and determines whether the target pixel constitutes the predetermined dot based on whether the pixels of the image data of the first resolution included in the processing rectangle match the first predetermined dot pattern.

4. The apparatus according to claim 3, wherein, in the determination, in a case that the position to adapt the processing rectangle is shifted in accordance with the start phase of the predetermined dot, the controller uses another predetermined dot pattern to be compared to the pixels of the image data of the first resolution included in the processing rectangle and determines whether the target pixel constitutes the predetermined dot based on whether the pixel matches the another predetermined dot pattern.

5. The apparatus according to claim 2, wherein, in the conversion, the controller converts the resolution of the image data by changing a product-sum operation coefficient for pixels included in the processing rectangle between a case in which the target pixel is determined to constitute the predetermined dot and a case in which the target pixel is not determined to constitute the predetermined dot.

6. The apparatus according to claim 5, wherein, in the conversion, in a case that the target pixel is not determined to constitute the predetermined dot, the controller converts the resolution of the image data using a product-sum operation coefficient aiming at a spot-multiplexing effect.

7. The apparatus according to claim 5, wherein in the conversion, in a case that the target pixel is determined to constitute the predetermined dot, the controller converts the resolution of the image data using a product-sum operation coefficient that makes reproducibility of the image data of the second resolution close to that of the target pixel.

8. The apparatus according to claim 1, wherein, in the conversion, in a case that the target pixel is determined to constitute the predetermined dot, the controller converts the resolution of the image data by performing simple thinning of the image data of the first resolution to normalize the image data to the same bit depth as the image data of the second resolution.

9. The apparatus according to claim 1, wherein, in the conversion, in a case that the target pixel is determined to constitute the predetermined dot, the controller replaces the target pixel with a pixel value of the second resolution defined in advance.

10. The apparatus according to claim 1, wherein the predetermined dot pattern includes a small dot pattern corresponding to image data obtained by performing correction processing according to a bending characteristic of a laser scanner for the image data of the first resolution.

11. The apparatus according to claim 1, wherein the image data of the first resolution is image data that has undergone screen processing.

12. A method of controlling an image processing apparatus for converting image data of a first resolution into image data of a second resolution lower than the first resolution, the method comprising:
- determining whether a target pixel in the image data of the first resolution constitutes a predetermined dot by determining whether an area including the target pixel matches a predetermined dot pattern; and
- converting a resolution of the image data from the first resolution to the second resolution by applying first coefficients to pixels of an area including a target pixel determined not to constitute the predetermined dot, and by applying second coefficients different from the first coefficients to pixels of an area including a target pixel determined to constitute the predetermined dot.

13. A non-transitory computer readable storage medium storing a program for causing a processor to execute a method of controlling an image processing apparatus for converting image data of a first resolution into image data of a second resolution lower than the first resolution, the method comprising:
- determining whether a target pixel in the image data of the first resolution constitutes a predetermined dot by determining whether an area including the target pixel matches a predetermined dot pattern; and
- converting a resolution of the image data from the first resolution to the second resolution by applying first coefficients to pixels of an area including a target pixel determined not to constitute the predetermined dot, and by applying second coefficients different from the first coefficients to pixels of an area including a target pixel determined to constitute the predetermined dot.

14. The apparatus according to claim 1, wherein each of the first coefficients is not zero, and all of the second coefficients are zero other than one of the second coefficients.

15. The apparatus according to claim 1, wherein the first coefficients are arranged so that each of the pixels in the area including the target pixel contributes to the image data subjected to the conversion of the resolution of the image data, and the second coefficients are arranged so that the pixels in the area except for the target pixels do not contribute to the image data subjected to the conversion of the resolution of the image data.

16. The apparatus according to claim 1, wherein the determination is performed by shifting a window of a predetermined size on the image data of the first resolution to select the area.

17. The apparatus according to claim 16, wherein the window is shifted from a position selected according to a location of a small dot.

* * * * *